(No Model.)
F. M. BELL.
ELECTRIC BATTERY.
No. 592,722.                    Patented Oct. 26, 1897.
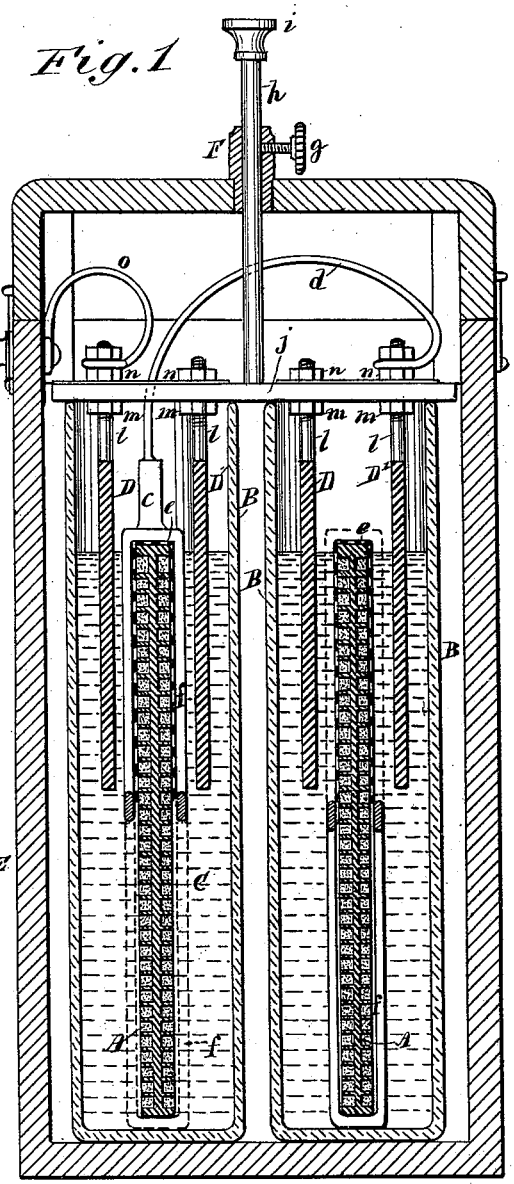
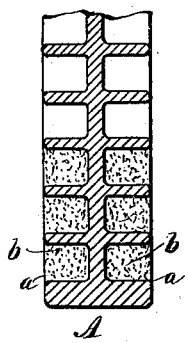
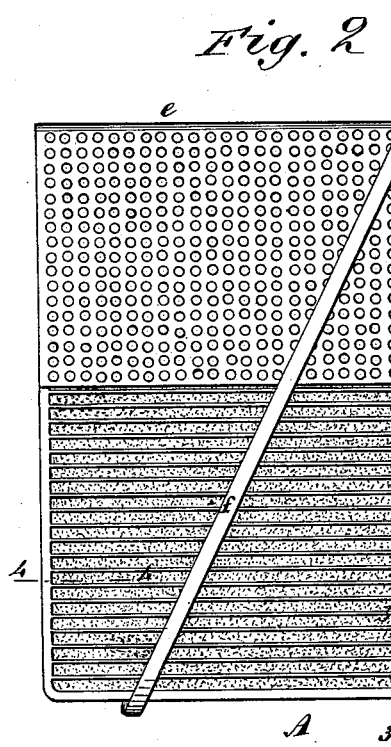
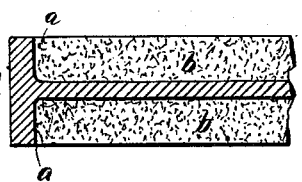
WITNESSES:
C. Neveux
G. M. Hopkins.
INVENTOR
F. M. Bell
BY
ATTORNEYS.

UNITED STATES PATENT OFFICE.

FRANK M. BELL, OF NEW YORK, N. Y.

ELECTRIC BATTERY.

SPECIFICATION forming part of Letters Patent No. 592,722, dated October 26, 1897.

Application filed May 18, 1896. Serial No. 591,958. (No model.)

*To all whom it may concern:*

Be it known that I, FRANK M. BELL, of New York city, in the county and State of New York, have invented a new and Improved Electric Battery, of which the following is a full, clear, and exact description.

The object of my invention is to construct a primary battery having a low internal resistance and a high voltage and amperage and in which the negative plate may be recharged when exhausted.

My invention consists in a battery having a negative plate formed of a lead grid filled with peroxid of lead and provided with a perforated protecting-covering of insulating material and amalgamated zinc positive plates suspended on opposite sides of the negative plate, the negative and positive plates being immersed in an electrolyte, preferably composed of water, sulfuric acid, and bisulfate of mercury.

Reference is to be had to the accompanying drawings, forming a part of this specification, in which similar characters of reference indicate corresponding parts in all the views.

Figure 1 is a vertical transverse section of a plunging-battery constructed according to my improvement. Fig. 2 is a side elevation of the negative plate. Fig. 3 is an enlarged vertical transverse section of the negative plate, taken on the line 3 3 of Fig. 2; and Fig. 4 is an enlarged horizontal section of the negative plate, taken on line 4 4 in Fig. 2.

The negative plate A in the present case is formed of a plate of lead having grooves $a$ in opposite sides thereof, the said grooves being provided with a filling $b$ of peroxid of lead. The upper end of the plate A is provided with a lug $c$, which is formed integrally with the plate and to which is attached the conductor $d$. The upper end of the plate A is covered on opposite sides with a sheet $e$ of perforated hard rubber or other suitable insulating material, the said perforated sheet being held in place by one or more elastic bands $f$, stretched over the ends of the plate, as shown, and also by the springing of its free edges down upon the opposite sides of the zinc plate. The plate thus prepared is placed in a jar B, containing the electrolyte C, and on opposite sides of the plate A, in the upper portion of the jar B, are suspended the amalgamated zinc plates D D'.

The solution in which the elements are placed consists of sulfuric acid, one part; water, ten parts, and two ounces of bisulfate of mercury added to a full gallon of acid solution. In the present case two jars B are placed in a box E, having in the cover thereof a sleeve F, provided with a binding-screw $g$. In the sleeve F is placed a rod $h$, provided with a knob $i$ at its upper end and having at its lower end a cross-bar $j$. The plates D D' are provided with screw-threaded shanks $l$, which extend through the cross-bar $j$ and the metal plates connecting the same and receive nuts $m$ $n$ above and below the bar $j$.

The shank $l$ of the plate D at one side of the left-hand battery-cell is connected by a flexible wire $o$ with a binding-post $p$, attached to the side of the box E, and the shank $l$ of the right-hand battery-cell at the opposite side of the box is connected electrically with the negative plate of the left-hand cell, while the negative plate of the right-hand cell is connected electrically with a binding-post (not shown) which corresponds with the binding-post $p$.

By this construction the battery is made a plunging-battery and the zinc plates may be lifted by means of the rod $h$, and when desired may be clamped in an elevated position by the screw $g$. The bisulfate of mercury maintains the amalgamation of the zinc plates and adds to the efficiency of the battery as it is reduced. When the negative plate is exhausted or the peroxid of lead is reduced to an oxid, the said negative plates are removed from the battery and placed in a solution consisting of water five parts and sulfuric acid one part, and the negative plate is recharged by sending a current of electricity through a plate of lead in the acid solution into the exhausted plate.

By employing a perforated insulating-covering for the upper end of the negative plate only the lower end of the plate is free and unimpeded in its discharge, thereby enabling the plate and battery to give a higher electromotive force for a longer period of discharge. It also serves as a means for guiding the movable elements on each side of the plate and permits them to be moved up or down without danger of being caught thereon.

My improved battery generates no fumes, deposits no sediment, and there are no creeping salts.

Having thus described my invention, I claim as new and desire to secure by Letters Patent—

1. An electric-battery element, formed of a lead negative plate provided with a body of peroxid of lead, one or more amalgamated zinc positive plates, a perforated sheet of insulating material extending over the upper end only of the negative plate and inserted between the positive and negative plates, an elastic band stretched over the perforated sheet and over the negative plate, and an electrolyte surrounding the positive and negative plates, substantially as specified.

2. A negative plate for batteries, comprising a lead plate having its sides grooved transversely, a filling of peroxid of lead in said grooves, a perforated cover of insulating material extending over the upper end only of the plate, and means for securing the cover on the plate, substantially as described.

FRANK M. BELL.

Witnesses:
JNO. M. RITTER,
F. W. HANAFORD.